(12) United States Patent
Edwards

(10) Patent No.: US 7,360,335 B2
(45) Date of Patent: Apr. 22, 2008

(54) FISHING LURE

(76) Inventor: J. Kevin Edwards, 2605 Sherwood Oaks Ct., Decatur, AL (US) 35603

( * ) Notice: Subject to any disclaimer, the term of this patent is extended or adjusted under 35 U.S.C. 154(b) by 175 days.

(21) Appl. No.: 11/444,509

(22) Filed: Jun. 1, 2006

(65) Prior Publication Data

US 2007/0277423 A1    Dec. 6, 2007

(51) Int. Cl.
  *A01K 85/10*    (2006.01)
  *A01K 85/18*    (2006.01)
(52) U.S. Cl. ............... 43/42.13; 43/42.14; 43/42.28
(58) Field of Classification Search ........... 43/42.13, 43/42.14, 42.11, 42.24, 42.28, 42.09
  See application file for complete search history.

(56) References Cited

U.S. PATENT DOCUMENTS

| | | | | |
|---|---|---|---|---|
| 800,536 A * | 9/1905 | Bailey et al. | ............ | 43/42.14 |
| 893,664 A * | 7/1908 | Shakespeare, Jr. | ......... | 43/42.14 |
| 1,295,617 A * | 2/1919 | Shannon | ............ | 43/42.13 |
| 1,682,710 A * | 8/1928 | Pflueger | ............ | 43/42.13 |
| 1,948,823 A * | 2/1934 | Lissy | ............ | 43/42.13 |
| 2,167,945 A * | 8/1939 | Gilliam | ............ | 43/42.13 |
| 2,261,433 A * | 11/1941 | Demory | ............ | 43/42.13 |
| 2,266,234 A * | 12/1941 | Mitchell | ............ | 43/42.13 |
| 2,307,200 A * | 1/1943 | Cullerton | ............ | 43/42.13 |
| 2,471,499 A * | 5/1949 | Shipman | ............ | 43/42.13 |
| 2,857,703 A * | 10/1958 | Parmlee | ............ | 43/42.28 |
| 2,935,809 A * | 5/1960 | Pratt | ............ | 43/42.13 |
| 3,001,318 A * | 9/1961 | Miller | ............ | 43/42.13 |
| 3,253,363 A * | 5/1966 | Steehn | ............ | 43/42.13 |
| 3,257,750 A * | 6/1966 | Shannon | ............ | 43/42.13 |
| 3,260,011 A * | 7/1966 | Reamy | ............ | 43/42.09 |
| 3,359,674 A * | 12/1967 | Strumor | ............ | 43/42.09 |
| 3,546,804 A * | 12/1970 | Woolums | ............ | 43/42.11 |
| 3,747,256 A * | 7/1973 | Haddock | ............ | 43/42.13 |
| 3,750,325 A * | 8/1973 | Feltman | ............ | 43/42.14 |
| 3,808,726 A * | 5/1974 | Flanagan, Jr. | ............ | 43/42.13 |
| 3,828,463 A * | 8/1974 | Perrin | ............ | 43/42.11 |
| 3,996,688 A * | 12/1976 | Hardwicke, III | ............ | 43/42.11 |
| 4,003,154 A * | 1/1977 | Carver | ............ | 43/42.13 |
| 4,011,681 A * | 3/1977 | Johnson | ............ | 43/42.11 |
| 4,012,862 A * | 3/1977 | Dubois | ............ | 43/42.11 |
| 4,033,065 A * | 7/1977 | Shannon | ............ | 43/42.13 |
| 4,037,345 A * | 7/1977 | Dubois | ............ | 43/42.13 |
| 4,045,903 A * | 9/1977 | Parker | ............ | 43/42.11 |
| 4,133,135 A * | 1/1979 | Miles | ............ | 43/42.13 |
| 4,201,008 A * | 5/1980 | Sparkman | ............ | 43/42.13 |
| 4,209,932 A * | 7/1980 | Pate | ............ | 43/42.13 |
| 4,329,804 A * | 5/1982 | Brown | ............ | 43/42.13 |

(Continued)

FOREIGN PATENT DOCUMENTS

JP    2000060365 A  *  2/2000

(Continued)

*Primary Examiner*—Darren W Ark
(74) *Attorney, Agent, or Firm*—Stephen R. Greiner

(57) ABSTRACT

A fishing lure including a U-shaped body having a primary member and a secondary member joined together by a crosspiece. A fishhook and a weight are affixed to the rear of the primary member. The weight has a bulb and a rearwardly extending stem that terminates at an enlarged shoulder. A detachable blade harness is releasably attached to the weight and includes an elastomeric tether to which is rotatably attached a pair of spinner blades. A buzz blade is rotatably attached to the secondary member.

4 Claims, 1 Drawing Sheet

U.S. PATENT DOCUMENTS

| | | | | |
|---|---|---|---|---|
| 4,510,710 A * | 4/1985 | Hanna et al. | | 43/42.13 |
| 4,551,940 A * | 11/1985 | East | | 43/42.13 |
| 4,619,067 A * | 10/1986 | West | | 43/42.09 |
| 4,625,448 A * | 12/1986 | Borders | | 43/42.13 |
| 4,640,041 A * | 2/1987 | Stanley | | 43/42.13 |
| 4,718,191 A * | 1/1988 | Gentry | | 43/42.13 |
| 4,742,639 A * | 5/1988 | Gunn | | 43/42.13 |
| 4,765,085 A * | 8/1988 | Wotawa et al. | | 43/42.13 |
| 4,773,180 A * | 9/1988 | Shimizu | | 43/42.13 |
| 4,777,758 A * | 10/1988 | Phillips | | 43/42.09 |
| 4,793,089 A * | 12/1988 | Long et al. | | 43/42.13 |
| 4,815,233 A * | 3/1989 | Pingel | | 43/42.13 |
| 4,884,358 A * | 12/1989 | Grove et al. | | 43/42.13 |
| 4,888,908 A * | 12/1989 | Morris | | 43/42.14 |
| 4,930,247 A * | 6/1990 | Dubois | | 43/42.31 |
| 4,967,505 A * | 11/1990 | Wulff | | 43/42.25 |
| 5,024,019 A * | 6/1991 | Rust et al. | | 43/42.13 |
| 5,136,801 A * | 8/1992 | Pond | | 43/42.13 |
| 5,138,789 A * | 8/1992 | Hood | | 43/42.13 |
| 5,146,706 A * | 9/1992 | Hilliard | | 43/42.13 |
| 5,182,876 A * | 2/1993 | Lewis | | 43/42.09 |
| 5,201,784 A * | 4/1993 | McWilliams | | 43/42.13 |
| 5,226,253 A * | 7/1993 | Daniel et al. | | 43/42.13 |
| 5,226,268 A * | 7/1993 | Sisson, Jr. | | 43/42.13 |
| 5,228,230 A * | 7/1993 | Vaught | | 43/42.28 |
| 5,355,612 A * | 10/1994 | Smith | | 43/42.13 |
| 5,400,542 A * | 3/1995 | Johnson | | 43/42.14 |
| 5,412,899 A * | 5/1995 | Reboul | | 43/42.13 |
| 5,426,886 A * | 6/1995 | Stanley | | 43/42.31 |
| 5,499,470 A * | 3/1996 | Reed | | 43/42.13 |
| 5,499,471 A * | 3/1996 | Foutch et al. | | 43/42.31 |
| 5,517,782 A * | 5/1996 | Link et al. | | 43/42.31 |
| 5,524,378 A * | 6/1996 | Hood | | 43/42.31 |
| 5,524,379 A * | 6/1996 | Hood | | 43/42.31 |
| 5,564,218 A * | 10/1996 | Kato | | 43/42.13 |
| 5,605,004 A * | 2/1997 | Boullt et al. | | 43/42.13 |
| 5,647,163 A * | 7/1997 | Gorney | | 43/42.13 |
| 5,664,365 A * | 9/1997 | Walden | | 43/42.13 |
| 5,709,047 A * | 1/1998 | Link | | 43/42.28 |
| 5,857,284 A * | 1/1999 | Gunderson | | 43/42.13 |
| 5,887,379 A * | 3/1999 | Lockhart | | 43/42.13 |
| 5,911,570 A * | 6/1999 | Freitas et al. | | 43/42.13 |
| 5,930,941 A * | 8/1999 | Hayes, II et al. | | 43/42.13 |
| 5,956,886 A * | 9/1999 | Choate | | 43/42.13 |
| 5,974,723 A * | 11/1999 | Taibi | | 43/42.13 |
| 5,987,805 A * | 11/1999 | Laney | | 43/42.13 |
| 6,018,901 A * | 2/2000 | DuBois | | 43/42.13 |
| 6,041,538 A * | 3/2000 | Roemer | | 43/42.09 |
| H1865 H * | 10/2000 | Aoki | | 43/42.13 |
| 6,158,162 A * | 12/2000 | Loniello | | 43/42.13 |
| 6,173,521 B1 * | 1/2001 | Rockhill, Jr. | | 43/42.13 |
| 6,199,312 B1 * | 3/2001 | Link | | 43/42.28 |
| 6,266,914 B1 * | 7/2001 | Johnson et al. | | 43/42.13 |
| 6,272,787 B1 * | 8/2001 | Link | | 43/42.28 |
| 6,591,543 B2 * | 7/2003 | Sabine | | 43/42.14 |
| 6,598,336 B2 * | 7/2003 | Link | | 43/42.28 |
| 6,601,336 B1 * | 8/2003 | Link | | 43/42.13 |
| 6,665,977 B2 * | 12/2003 | Hammond | | 43/42.13 |
| 6,675,524 B2 * | 1/2004 | McNally et al. | | 43/42.13 |
| 6,684,559 B2 * | 2/2004 | Johnson et al. | | 43/42.13 |
| 6,701,662 B1 * | 3/2004 | Moore | | 43/42.13 |
| 6,748,692 B2 * | 6/2004 | Sprouse | | 43/42.13 |
| 6,880,287 B2 * | 4/2005 | Eubanks | | 43/42.13 |
| 6,918,204 B1 * | 7/2005 | Trantham | | 43/42.13 |
| 6,955,004 B2 * | 10/2005 | Phipps | | 43/42.13 |
| 7,010,881 B2 * | 3/2006 | Altman | | 43/42.13 |
| 7,114,285 B1 * | 10/2006 | Ince | | 43/42.09 |
| 7,197,846 B1 * | 4/2007 | Gibson | | 43/42.13 |
| 2003/0074828 A1 * | 4/2003 | Sprouse | | 43/42.13 |
| 2003/0145510 A1 * | 8/2003 | Kohigashi et al. | | 43/42.13 |
| 2003/0159327 A1 * | 8/2003 | Roemer | | 43/42.13 |
| 2003/0233782 A1 * | 12/2003 | Routsaw | | 43/42.13 |
| 2004/0006908 A1 * | 1/2004 | Essad et al. | | 43/42.13 |
| 2004/0074134 A1 * | 4/2004 | Morlen | | 43/42.13 |
| 2004/0221502 A1 * | 11/2004 | Eubanks | | 43/42.13 |
| 2005/0229473 A1 | 10/2005 | Altman | | |

FOREIGN PATENT DOCUMENTS

| | | | |
|---|---|---|---|
| JP | 2000069882 A * | 3/2000 | |
| JP | 2002325532 A * | 11/2002 | |
| WO | WO 9730584 A1 * | 8/1997 | |

* cited by examiner

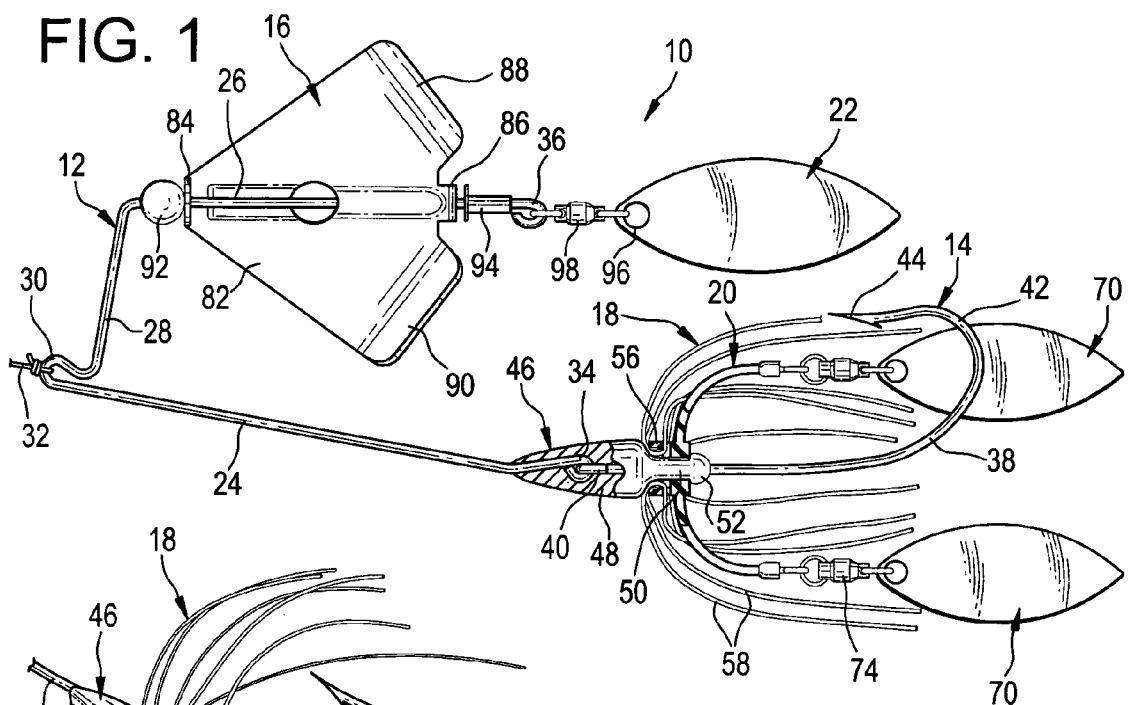
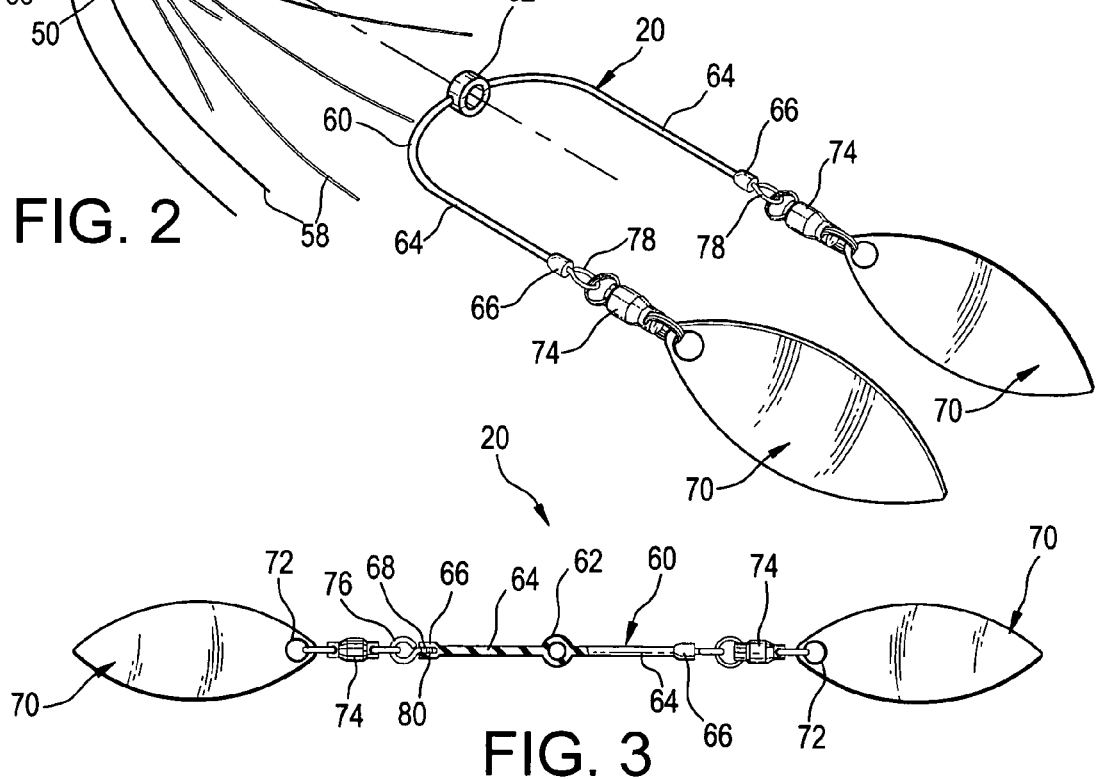

FISHING LURE

FIELD OF THE INVENTION

The present invention relates generally to apparatus for fishing, trapping and vermin destroying and, more particularly, to artificial fishing baits with movably connected rigid lure members.

BACKGROUND OF THE INVENTION

For generations, fishermen have developed lures for attracting and catching fish. One popular and effective top-water lure, the buzz-bait, includes a wire body with a water-churning propeller at one end and a fishhook hidden by a number of wiggling filaments at the other. Many game fish find the sight of churning water and wiggling filaments to be an irresistible inducement to strike, but many of the largest game fish do not seem to find such an offering worth the trouble.

Some fishermen have attached one or more spinner blades to the wire body of a buzz bait in an effort to simulate a small school of fish with the hope of attracting giant quarry. While these enhanced buzz baits have been successful in catching larger fish, they do have some drawbacks. Aside from costing more than baits with a single spinner blade, perhaps their most significant drawback is that they do not permit the extra spinner blades to be easily changed so as to permit effective fishing in a variety of environments. So, an enhanced buzz bait, configured for attracting one species of fish in one environment, is not effective in attracting another sort of fish in another environment. Thus, the appeal of these baits has, heretofore, been solely to professionals and highly skilled amateurs.

SUMMARY OF THE INVENTION

In light of the problems associated with the known buzz baits with extra spinner blades, it is a principal object of the invention to provide a fishing lure that, when retrieved, has a realistic swimming motion simulative of a small school of bait fish. Among other things, the number, size, and color of the simulated baitfish can be easily changed by a fisherman to suit the fishing environment. Such a lure will attract and catch more fish than lures now available. For users of the lure, then, fishing will prove to be a more productive pastime.

It is a further object of the present invention to provide a fishing lure of the type described that is easy to use and can be deployed with minimal instruction and without resort to any tools. The fishing lure is intuitive to use.

It is an object of the invention to provide improved features and arrangements thereof in a fishing lure for the purposes described that is lightweight in construction, inexpensive to manufacture, and fully dependable in use.

Briefly, the fishing lure in accordance with this invention achieves the intended objects by featuring a body having a primary member and a secondary member joined by a crosspiece. A fishhook and a weight are affixed to the primary member. The weight has a bulb and a stem that terminates at an enlarged shoulder. A blade harness is releasably attached to the weight. The harness has: an elastomeric tether with a tubular sleeve positioned upon the stem, a pair of retaining arms extending from the sleeve, and a respective one of a pair of cups affixed to each of the arms and having a socket therein. An eyebolt is screwed into each socket. A swivel connector is attached to each eyebolt. A first spinner blade is attached to each swivel connector. A buzz blade is rotatably attached to the secondary member.

The foregoing and other objects, features, and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a side view of a fishing lure in accordance with the present invention with portions broken away to reveal details thereof.

FIG. 2 is a perspective view of a portion of the fishing lure of FIG. 1 with the spinner blade harness being shown in a detached condition.

FIG. 3 is a side view of the blade harness forming part of the fishing lure.

Similar reference characters denote corresponding features consistently throughout the accompanying drawings.

DETAILED DESCRIPTION OF THE PREFERRED EMBODIMENT

Referring now to the FIGS., a fishing lure in accordance with the present invention is shown at 10. Lure 10 includes a wire body 12 that carries a fishhook 14 and a buzz blade 16 in a spaced apart relationship. Fishhook 14 is camouflaged by a skirt 18 and a blade carrying harness 20 that are releasably fastened to body 12. Another spinner blade 22 is attached to body 12 adjacent buzz blade 16 to further impart to lure 10 the appearance of a small school of minnows.

Wire body 12 has a primary member 24 and a secondary member 26 joined together by a crosspiece 28 in a U-shaped arrangement. As shown, primary member 24 is somewhat longer than secondary member 26 that is somewhat longer than crosspiece 28. The front of primary member 24 is provided with a crook 30 for the attachment of a fishing line 32 to lure 10. The rear of primary member 24, however, is provided with a closed loop 34 for the attachment of fishhook 14. Similarly, the rear of secondary member 26 is provided with a closed loop 36 that serves as an attachment point for spinner blade 22.

Fishhook 14 includes a shank 38 having an eye 40 formed at one end thereof and an open hook 42 formed at the other end thereof. Hook 42 terminates at a barb 44 for penetrating the mouth of a fish. Loop 34 extends through eye 40 so as to attach fishhook 14 to body 12.

A streamlined weight 46 is affixed to the rear of primary member 24. Weight 46 has a bulb 48 that encloses both loop 34 and eye 40. A stem 50 of reduced diameter extends rearwardly from bulb 48 and encloses a short segment of shank 38. Stem 50 terminates at an enlarged shoulder 52 that also encloses a bit of shank 38. If desired, weight 46 can be coated with paint or colored plastic and can be provided with indicia 54 with the appearance of eyeballs to simulate the appearance of a minnow.

A skirt 18 is releasably attached to weight 46. Skirt 18 includes an elastomeric band 56 adapted for snug, yet releasable, positioning about stem 50. Extending through the center of band 56 is a number of colorful, rubber strips 58 to that serve to conceal fishhook 14 and also to attract fish by their wiggling motion in water. In use, band 56, with rubber strips 58 extending through it, is slid along the length of fishhook 14, over shoulder 52, and onto the front of stem 50.

Detachable blade harness 20 is releasably attached to weight 46 adjacent skirt 18. Harness 20 includes an elastomeric tether 60 that has a tubular sleeve 62 at its center configured for a snug, yet releasable, fit upon stem 50 next to band 56. Affixed to, and extending outwardly from, the opposite sides of sleeve 62 is a pair of retaining arms 64 that flutter when drawn through water. Affixed to, and extending outwardly from, the free end of each of arms 64 is one of a pair cups 66. Each cup 66 defines an outwardly opening socket 68 for the attachment of a pair of spinner blades 70 to tether 60.

A respective one of a pair of spinner blades 70 is attached to each end of tether 60. As illustrated, each blade 70 has an outline resembling that of a willow leaf and is, also, concave on one side and convex on the other. A hole to 72 is provided at the front of each blade 70 to which the back of a respective one of a pair of swivel connectors 74 is joined. The front of each swivel connector 74 is joined to the closed loop or eye 76 of a respective one of a pair of eyebolts 78. The threaded shaft 80 of each eyebolt 78 is screwed into a respective one of sockets 68 so that eye 76 projects outwardly from a cup 66 and spinner blades 70 turn freely relative to elastomeric tether 60 by means of swivel connectors 74.

Buzz blade 16 is formed from sheet metal and rotates on secondary member 26. Buzz blade 16 includes a substantially planar body 82 with apertured lugs 84 and 86 respectively disposed at the front and rear of body 82 through which secondary member 26 freely extends. A pair of semicircular wings 88 and 90 project downwardly and outwardly from opposite sides of body 82. In FIG. 1, wing 88 projects away from the viewer and wing 90 projects toward the viewer so as impart a pressure differential on body that causes buzz blade 16 to rotate about secondary member 26 when lure 10 moves in water. Serving as bearings to ensure the free rotation of buzz blade 16, a bead 92 is disposed at the front of secondary member 26 and a grommet 94 is disposed at the rear of secondary member 26 adjacent loop 36.

A spinner blade 22 is attached to loop 36. Like blades 70, blade 22 is willow leaf-shaped and is concave on one side thereof and convex on the other side thereof. A hole 96 is provided at the front of blade 22 to which the back of a swivel connector 98 is joined. The front of swivel connector 98 is joined to loop 36 so as to permit blade 22 to rotate about its longitudinal axis adjacent fishhook 14.

The use of fishing lure 10 is straightforward. First, fishing line 32 is tied within crook 30 to wire body 12. Next, if such is not already in place, detachable blade carrying harness 20 is secured by means of tether sleeve 62 to stem 50 of weight 46. Now, lure 10 can be put into a body of water in an effort to catch fish.

Lure 10 is cast and retrieved in the usual manner by means of a rod and reel (not shown). During retrieval, lure 10 can be given a wiggling action by manipulating the rod and reel so that buzz blade 16 and spinner blades 22 and 70 to visually simulate the erratic motions of a small school of wounded minnows that game fish find attractive. Furthermore, the wiggling of arms 64 of tether 60 permit blades 70 to occasionally tap fishhook 14 and one another to produce sonic emanations that travel away from lure 10 to attract game fish that cannot see lure 10. For game fish that can see lure 10, rubber strips 58 of skirt 18 enhance the tendency of game fish to strike.

If game fish do not appear to be biting, replacing harness 20 with another one, can enhance opportunities for a strike. The second harness 20 can be provided with spinner blades that are a different color, or size, or weight, or shape, than the first harness 20. Alternatively, skirt 18 can be removed or replaced by one with rubber strips 58 having a different color or length. Also, any of spinner blades 22 and 70 can be removed by manipulating swivel connectors 74 and 98 in the normal way. Thus, lure 10 can be adjusted to maximize strikes from game fish in a variety of environments.

When a fish strikes lure 10, a tug is felt on line 32 and fishhook 14 is set in the mouth of the fish by pulling sharply on line 32. After line 32 is reeled in, the just-caught fish can be released from fishhook 14 and either set free or harvested. Use of lure 10, will provide a fisherman with more opportunities to make such a choice than has been previously possible.

When a fisherman has caught his limit or has otherwise decided to terminate his fishing efforts, lure 10 can be detached from line 32 and placed in a tackle box for reuse at a convenient time. No further disassembly of lure 10 is required as its compact size lends itself easy storage in a tackle box. The process of setting up lure 10 for use or stowing lure 10 after use requires just a few minutes to complete.

While fishing lure 10 has been described with a high degree of particularity, it will be appreciated by those skilled in the art that modifications can be made to it. Therefore, it is to be understood that the present invention is not limited solely to fishing lure 10 described above, but encompasses any and all fishing lure embodiments within the scope of the following claims.

I claim:

1. A fishing lure, comprising:
   a U-shaped body for tying to a fishing line and having a primary member and a secondary member joined by a crosspiece;
   a fishhook being affixed to a rear of said primary member;
   a weight being affixed to the rear of said primary member, said weight having a bulb and a stem extending rearwardly from said bulb, and said stem terminating at an enlarged shoulder;
   a detachable blade harness being releasably attached to said weight, said harness including:
      an elastomeric tether including:
         a tubular sleeve being positioned upon said stem between said bulb and said shoulder;
         a pair of retaining arms being affixed to, and extending outwardly from, said sleeve; and,
         a pair of cups, each of said cups being affixed to a respective one of said retaining arms, each of said cups having a socket therein;
      a pair of eyebolts, each of said eyebolts being attached to a respective one of said cups, and each of said eyebolts having a threaded shaft screwed into said socket in a respective one of said cups and also having an eye affixed to said threaded shaft;
      a pair of first swivel connectors, each of said first swivel connectors being attached to a respective one of said eyes;
      a pair of first spinner blades, each of said first spinner blades being attached to a respective one of said first swivel connectors; and,
   a buzz blade being rotatably attached to said secondary member.

2. The fishing lure according to claim 1 wherein said secondary member is provided with a closed loop at a rear thereof and said fishing lure further comprises:
- a second swivel connector being attached to said closed loop; and,
- a second spinner blade being attached to said second swivel connector.

3. The fishing lure according to claim 1 further comprising a skirt for camouflaging said fishbook, said skirt including:
- an elastomeric band snugly, yet releasably, positioned upon said stem adajacent said tubular sleeve; and,
- a plurality of rubber strips extending through said elasometric band and outwardly therefrom.

4. A fishing lure, comprising:
- a U-shaped body for tying to a fishing line and having a primary member and a secondary member joined by a crosspiece, said secondary member having a closed loop at a rear thereof;
- a fishhook being affixed to a rear of said primary member;
- a weight being affixed to the rear of said primary member, said weight having a bulb and a stem extending rearwardly from said bulb, and said stem terminating at an enlarged shoulder;
- a detachable blade harness being releasably attached to said weight, said harness including:
  - an elastomeric tether including:
    - a tubular sleeve being positioned upon said stem between said bulb and said shoulder;
    - a pair of retaining arms being affixed to, and extending outwardly from, said sleeve;
  - a pair of cups, each of said cups being affixed to a respective one of said retaining arms, each of said cups having a socket therein;
- a pair of eyebolts, each of said eyebolts being attached to a respective one of said cups, and each of said eyebolts having a threaded shaft screwed into said socket in a respective one of said cups and also having an eye affixed to said threaded shaft;
- a pair of first swivel connectors, each of said first swivel connectors being attached to a respective one of said eyes; and,
- a pair of first spinner blades, each of said first spinner blades being attached to a respective one of said first swivel connectors;
- a buzz blade being rotatably attached to said secondary member;
- a second swivel connector being attached to said closed loop;
- a second spinner blade being attached to said second swivel connector; and,
- a skirt for camouflaging said fishhook, said skirt including:
  - an elastomeric band snugly, yet releasably, positioned upon said stem adjacent said tubular sleeve; and,
  - a plurality of rubber strips extending through said elastomeric band and outwardly therefrom.

* * * * *